UNITED STATES PATENT OFFICE.

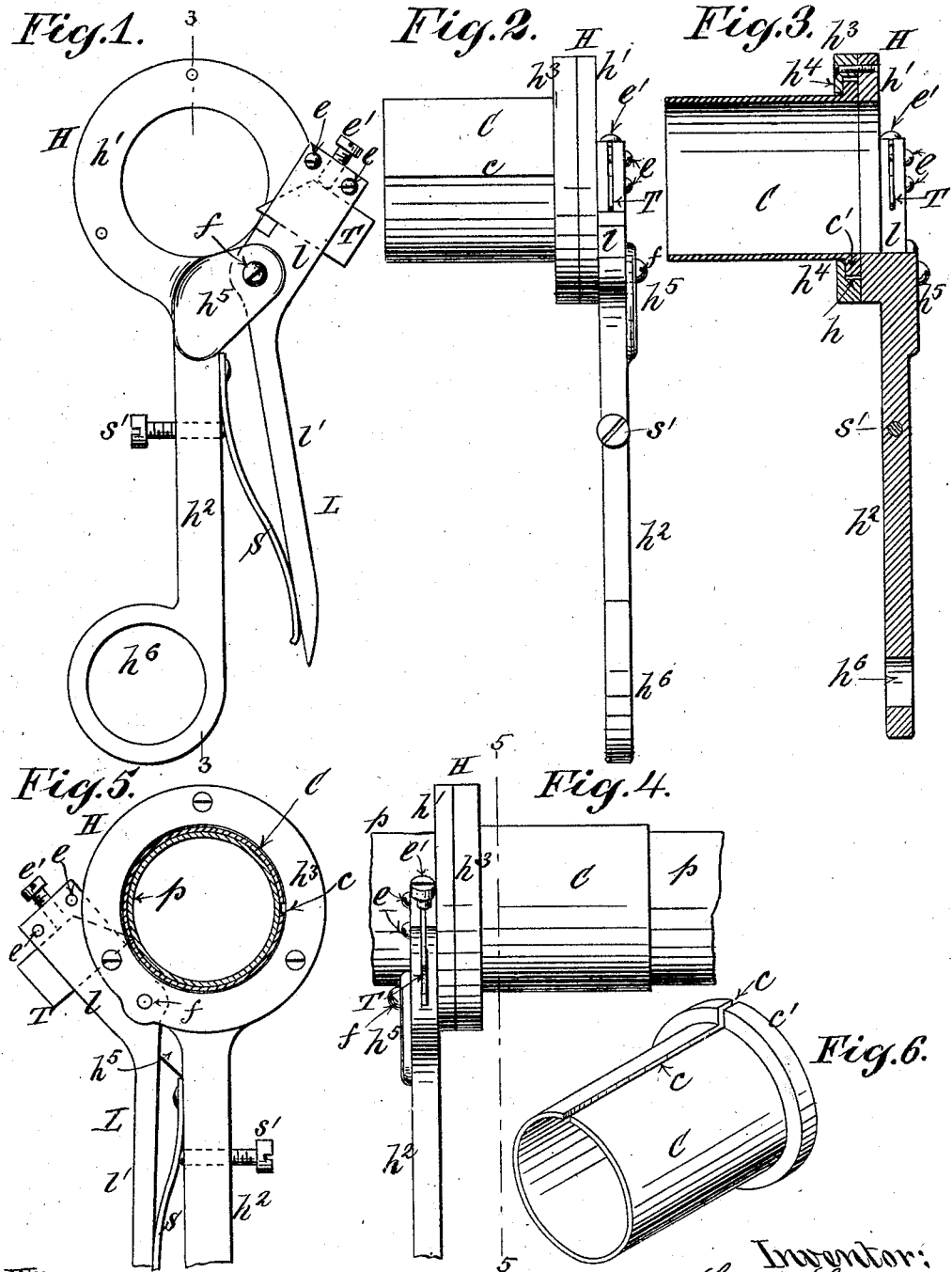

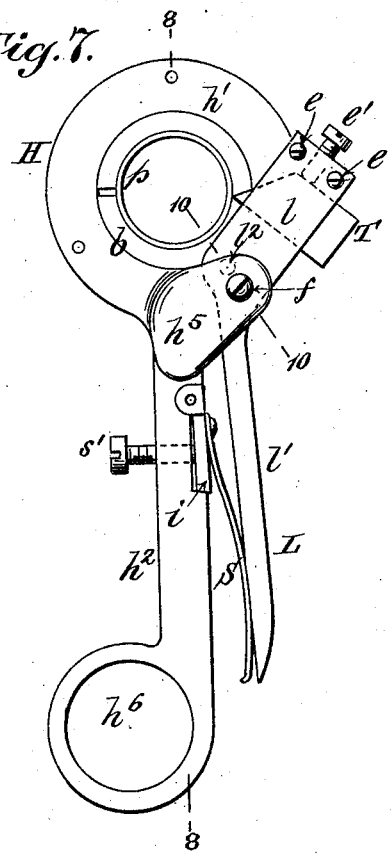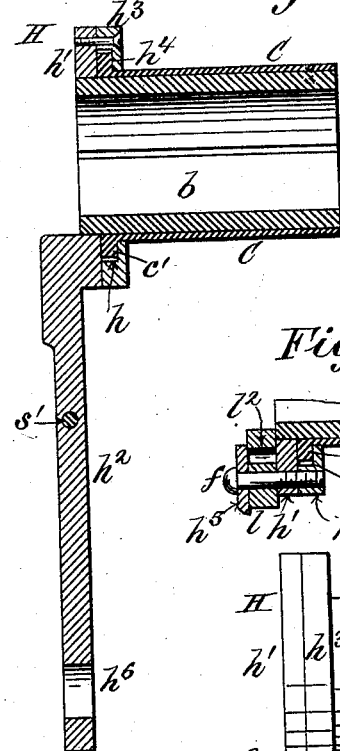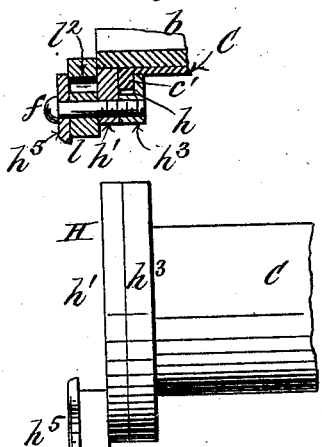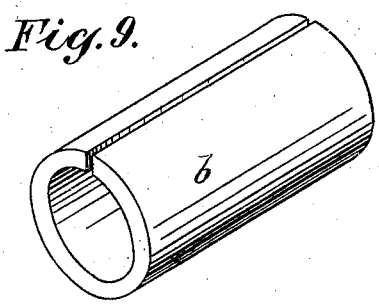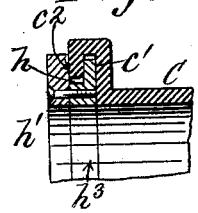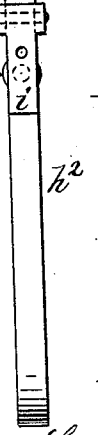

LOUIS LEYES, OF CITY ISLAND, NEW YORK.

PIPE-CUTTER.

No. 823,796.      Specification of Letters Patent.      Patented June 19, 1906.

Application filed March 24, 1906. Serial No. 307,767.

*To all whom it may concern:*

Be it known that I, LOUIS LEYES, a citizen of the United States, residing at City Island, county of New York, and State of New York, have invented certain new and useful Improvements in Pipe-Cutters, of which the following is a specification.

My invention relates specifically to means for cutting relatively thin metallic tubing and the like as distinguished from piping or tubing of sufficient thickness to enable it to withstand a degree of external pressure which will admit of its being clamped in an ordinary vise, pipe-wrench, or other mechanical expedient, by which it may be held rigid and stationary while subjected to the action of the cutting-tool, the pressure in such cases being applied only on certain portions of the periphery and not distributed uniformly circumferentially as in my implement as hereinafter set forth. Hence heretofore much inconvenience and loss of time has been involved in cutting such thin collapsible tubing, owing to the difficulty of holding and supporting it firmly without denting or otherwise injuring it, and it has been practically impossible to sever one section from another without changing the configuration of the tubing. The saws or files ordinarily used for the purpose also create a bur or roughness at the line of severance and render the operation comparatively slow, difficult, and uncertain.

These difficulties I overcome by my invention, which is distinguished from the prior state of the art by the use of a special form of clamp fitting over the tubing to be cut, said clamp consisting, essentially, of a split sleeve of flexible resilient material, upon which is mounted a rotatable cutter-head carrying a cutter-tool held to its work by elastic spring-pressure, which may be regulated to meet the requirements of the thickness of the tubing under treatment.

My invention also contemplates the use, in conjunction with the split clamping-sleeve, of a split bushing or bushings to compensate for differences in diameter of tubing and in certain other special features in the construction and arrangement of parts hereinafter described and claimed specifically.

In the accompanying drawings, Figure 1 is an elevation of the face or cutting-tool end of the implement; Fig. 2, an elevation taken at right angles to Fig. 1. Fig. 3 is a section upon plane of line 3 3, Fig. 1. Fig. 4 is an elevation of the implement, taken on the side opposite to Fig. 2, the handle being partly broken away and a piece of tubing being shown as extending through the implement. Fig. 5 is a transverse section taken upon plane of line 5 5, Fig. 4, and looking toward the cutter-head. Fig. 6 is an isometrical view of the clamp device. Fig. 7 is an elevation similar to Fig. 1, showing certain modifications in construction. Fig. 8 is a section upon plane of line 8 8, Fig. 7. Fig. 9 is an isometrical view of the split bushing shown in Figs. 7 and 8. Fig. 10 is a section upon plane of line 10 10, Fig. 7. Fig. 11 is an elevation taken at right angles to Fig. 7. Fig. 12 is a sectional detail showing a modification in the interlocking of the sleeve-clutch and tool-head.

The sleeve-clamp C is designed, primarily, to be held by hand, and this is one of the distinguishing advantages afforded by my implement as a whole, although obviously if preferred or found expedient the sleeve C may be held by means of an auxiliary device either movable or stationary without departing from the spirit and intent of my invention in this respect, since this form of external pipe-clamp is new in the art in so far as I am aware and may be advantageously employed in all cases where thin, fragile, and collapsible tubing is to be cut.

The sleeve-clamp C consists, essentially, of a cylinder of flexible resilient material, preferably metallic, split or cut longitudinally, so as to afford a space $c$ between the opposed edges when the sleeve is relaxed, and free from pressure externally applied—that is to say, the resilience of the metal or other material of which the sleeve-clamp is composed is relied upon to open or expand the clamp under normal conditions.

At one extremity the cylindrical sleeve C is formed with a peripheral annular collar $c'$ for engagement with the rotatable tool-head H, which is preferably, though not necessarily, annular in shape and is formed with an annular groove $h$, within which the annular collar $c'$ rests. The head H may be formed in any desired manner to engage with the sleeve-clamp C, so as to be rotatable thereon. In the drawings I show it as consisting of an annular plate $h'$, formed with a handle $h^2$ integral therewith and having screwed or otherwise rigidly secured to it the annular plate $h^3$, the inner annular flange $h^4$ of which overlaps the annular collar $c'$ of the clamp-sleeve C, which latter is placed in position before the two plates $h'$ and $h^3$ are united  The internal diameter of the plate $h'$ is approximately that of the clamp-sleeve C when the latter is expanded, and the depth of the annular shoulder $c'$ is such that the sleeve may be contracted until its opposed edges meet to close the space $c$ without danger of disengaging space $c$ represents the play or margin requisite to admit of the clamping of the sleeve the parts, although as a matter of fact in use said opposed edges do not meet, since the C upon tubing slightly less in external diameter than the internal diameter of the plate $h'$, the implement being so simple and cheap of structure that a separate implement may be provided for each standard size of tubing to be treated, or if this is inexpedient for any reason the implement may be made to accommodate a prescribed or maximum diameter of pipe $p$, and smaller sizes of pipe may be compensated for and accommodated by the use of an auxiliary split bushing $b$ of suitable material, as illustrated in Figs. 7, 8, and 9. In either case pressure applied externally around the sleeve C causes the pipe $p$ to be clamped circumferentially in such manner that the pressure is distributed evenly peripherally against and around the portion of the pipe within the length of the sleeve C, thereby reinforcing and sustaining the pipe in such manner as to preserve its shape and integrity.

The cutting-tool T is mounted on the short arm $l$ of the lever L, which is fulcrumed on the rotatable head H and between its face and a lateral spur or extension thereof $h^5$. The cutting-tool is secured in position by any suitable means. As shown in the drawings, the short arm $l$ of the lever L is bifurcated to receive the tool, and the bifurcated ends are clamped against the sides of the tool by lateral screws $e$ $e$, a third or binding screw $e'$ being used to reinforce and sustain the tool on its seat.

The short arm $l$ of the lever L is thrust inward by a spring S, interposed between the handle $h^2$ and the long arm $l'$ of said lever L, a flat leaf-spring being preferably used for the purpose attached to the handle $h^2$ near the head H and having its free end bearing against the under side of the lever, as shown in the drawings, although a coil-spring may be substituted with similar result. The pressure exerted by the spring S against the lever L may be regulated by means of an adjusting-screw $s'$ engaging with a female screw-thread formed for its reception in the handle $h^2$ and bearing against the inner surface of the spring. By this or equivalent means the pressure of the tool upon the tube to be cut may be adapted to the thickness of the material composing such tube, it being understood that the spring-pressure alone is relied upon to effect the cutting.

Thus in use, the long arm $l'$ of the lever L having been depressed against the resistance of the spring S in order to retract the tool T, a piece of thin tubing of suitable diameter is inserted through the sleeve C and head H and properly adjusted in position with relation to the tool T, or, what amounts to the same thing, the implement is passed over or applied to the tubing. The sleeve-clamp C is then firmly grasped and compressed by hand or otherwise, so as to hold the tube firmly in position against longitudinal or axial movement. The lever L is released and the head H rotated on the clamp-sleeve C and around the tube by means of the handle $h^2$, which may be provided with a finger-loop $h^6$ to facilitate the operation. As a result the point of the tool T impinging against the periphery of the tube forms a circumscribing incision in the tube, the resulting groove being gradually deepened, as the head H is rotated repeatedly until the tube is severed. The tube being supported on all sides with a uniform evenly-distributed peripheral pressure extending in close proximity to the cutter and the tension of the spring S being regulated to the strength and requirements of the tubing to be treated, all danger of distortion or change in configuration of the tubing in cross-section is eliminated. Furthermore, the application of the implement to the tubing and its manipulation to sever the same may be quickly and conveniently accomplished in a small fraction of the time necessarily involved in filing or sawing the tubing as heretofore, and this may be done under circumstances and conditions where a vise with saw or file would not be available.

Where the implement is designed to be used for more than one diameter of pipe, as where an auxiliary bushing $b$ is used, I prefer to make both the lever L and the support for the spring S adjustable, so as to adapt the device to the requirements of the smaller diameter of tubing. Thus in Figs. 7 and 10 the fulcrum $f$ is removable, consisting of the shank of a screw engaging a thread in the head H, and the lever L is formed with a plurality of pivotal holes $l^2$ in such manner that it may be set at different points with relation to the axial line of the clamping-sleeve C and head H, so as to bring the tool into proper relation to the peripheral surface of the tube to be cut. In this case also the spring S is secured to a plate $i$, hinged to the handle $h^2$, and the adjusting-screw $s$ bears against the under side of said plate, as shown in Fig. 7, by which means the spring S may be regulated in position with relation to the lever L in order to effect and maintain the same relative arrangement of parts under all conditions of use.

It is obvious that the means by which the interlocking of the sleeve C and head H is effected is of secondary importance, and to illustrate this fact I have shown a modification in Fig. 12 in which the annular collar $c'$ on the clamping-sleeve is formed with an overhanging or return flange $c^2$, which enters the groove $h$ in the head, the essential feature in this connection consisting in so forming and interlocking the parts that the sleeve is allowed play or margin in which to expand or contract, as hereinbefore set forth, while the head is freely rotatable on said sleeve.

I have found by actual experience that even the most thin delicate tubing may be safely, quickly, and conveniently cut by the use of my implement and that the tool leaves the new edges of the tubing in a comparatively smooth finished condition with practically no bur and with both sections of the tubing in their original shape without peripheral indentation or distortion of form. The exertion required to compress and hold the clamping-sleeve against the tubing is comparatively slight, especially after the first rotation of the cutting-head, since the tool then naturally tends to follow the circumscribing incision first made by it.

What I claim as my invention, and desire to secure by Letters Patent, is—

1. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, and a cutting-tool mounted on said rotatable tool-head, for the purpose described.

2. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, a tool-holding lever fulcrumed on said rotatable tool-head, a cutting-tool mounted on said lever, and a spring bearing against said lever, for the purpose described.

3. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical sleeve and interlocking with said annular peripheral shoulder on the sleeve, a tool-holding lever fulcrumed on said rotatable head, a cutting-tool mounted upon one arm of said lever, and a spring interposed between the other arm of said lever and a projection of the rotatable tool-head, for the purpose described.

4. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, a rockable tool-holder fulcrumed on said rockable head, a cutting-tool mounted upon said rockable tool-holder, and a spring bearing against said rockable tool-holder, for the purpose described.

5. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, said rotatable tool-head being formed with a projecting handle, a tool-holding lever fulcrumed on said rotatable head, a cutting-tool mounted upon one arm of said lever, and a flat metal spring interposed between the other arm of said lever and the handle of the rotatable tool-head, for the purpose described.

6. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, said rotatable tool-head being formed with a projecting handle, a tool-holding lever fulcrumed on said rotatable head, a cutting-tool mounted upon one arm of said lever, a flat metal spring interposed between the other arm of said lever and the handle of the rotatable tool-head, and means for regulating the pressure exerted by said spring for the purpose described.

7. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, said rotatable tool-head being formed with a projecting handle, a tool-holding lever fulcrumed on said rotatable head, a cutting-tool mounted upon one arm of said lever, a flat metal spring interposed between the other arm of said lever and the handle of the rotatable tool-head, and an adjusting-screw on said handle arranged to bear against said spring for the purpose described.

8. In an implement of the character designated, the combination of a cylindrical clamping-sleeve of flexible resilient material formed with a longitudinal opening extending the full length thereof and with a peripheral shoulder, a rotatable tool-head mounted upon said cylindrical clamping-sleeve and interlocking with said annular peripheral shoulder on the sleeve, a cutting-tool mounted on said rotatable tool-head, and a split bushing of flexible resilient material fitting within said cylindrical clamping-sleeve for the purpose described.

9. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve, said rotatable tool-head being formed with a projecting handle, a tool-holding lever fulcrumed on said rotatable head, means for adjusting said tool-holding lever on said rotatable head, a cutting-tool mounted upon one arm of said lever, and a spring interposed between the other arm of said lever and the handle of the rotatable tool-head, for the purpose described.

10. In an implement of the character designated, the combination of a cylindrical clamping-sleeve of flexible resilient material formed with a longitudinal opening extending the full length thereof and with an annular peripheral shoulder, a rotatable tool-head mounted upon said cylindrical clamping-sleeve and interlocking with said annular peripheral shoulder on the sleeve said rotatable tool-head being formed with a projecting handle, a tool-holding lever fulcrumed on said rotatable head, means for adjusting said tool-holding lever on said rotatable head, a cutting-tool mounted upon one arm of said lever, a plate pivotally supported on the handle of the rotatable tool-head, a flat metal spring secured to said pivotally-supported plate and bearing against the other arm of said tool-holding lever, and a screw on the handle of the rotatable tool-head arranged to bear on the inner side of said pivotally-supported plate for the purpose described.

LOUIS LEYES.

Witnesses:
F. E. LAURENCE,
W. A. WALTERS.

Correction in Letters Patent No. 823,796.

It is hereby certified that in Letters Patent No. 823,796, granted June 19, 1906, upon the application of Louis Leyes, of City Island, New York, for an improvement in "Pipe Cutters," an error appears in the printed specification requiring correction, as follows: On page 2, lines 8–9 and 10–11 should be transposed; and that the said Letters Patent should be read with this correction therein that the same may conform to the record of the case in the Patent Office.

Signed and sealed this 17th day of July, A. D., 1906.

[SEAL.]

E. B. MOORE,
*Acting Commissioner of Patents.*